R. SCOGGIN.
AIR BRAKE.
APPLICATION FILED JULY 7, 1914.
1,195,103.
Patented Aug. 15, 1916.
2 SHEETS—SHEET 1
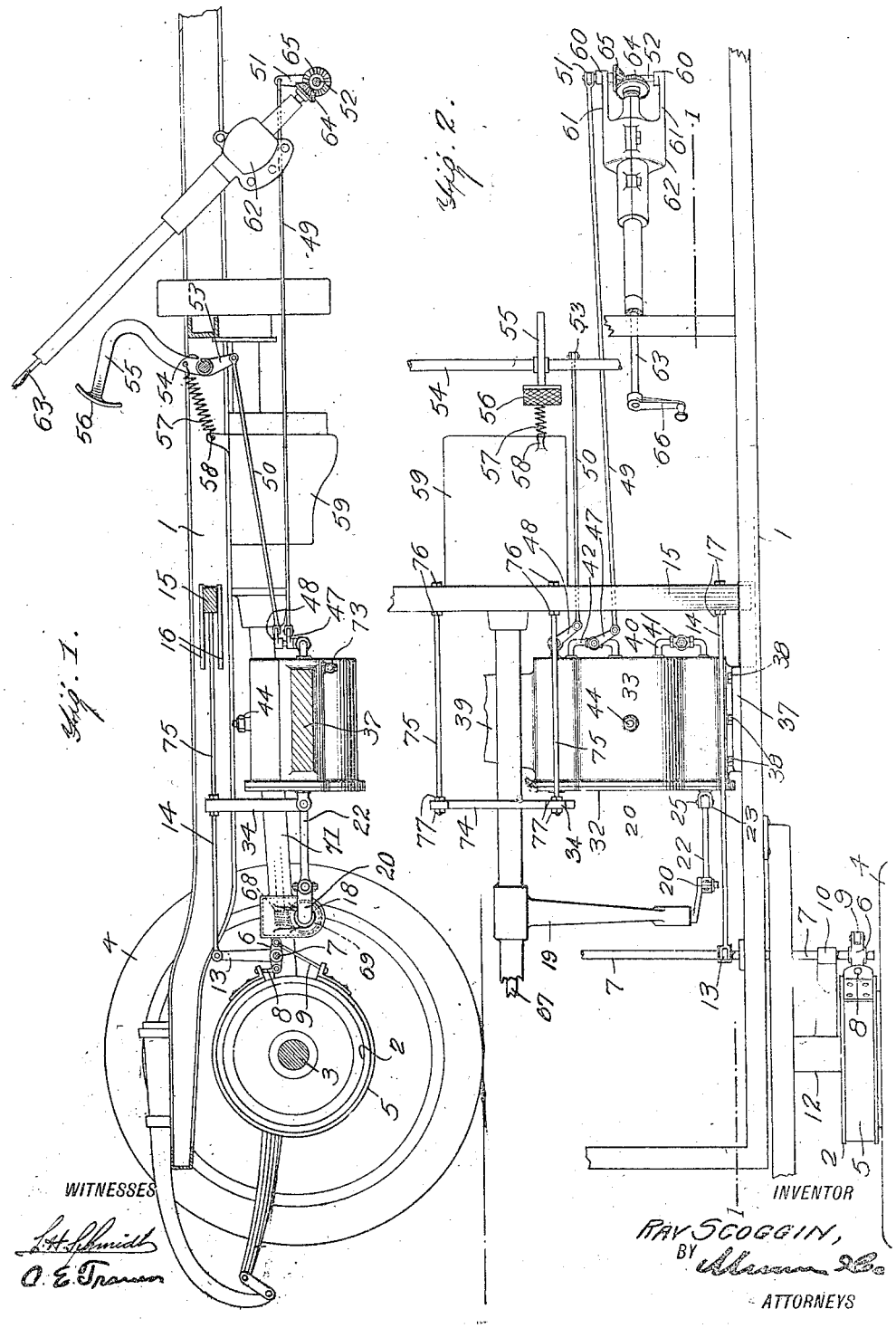
INVENTOR
RAY SCOGGIN,
BY
ATTORNEYS
WITNESSES R. SCOGGIN.
AIR BRAKE.
APPLICATION FILED JULY 7, 1914.
1,195,103.
Patented Aug. 15, 1916.
2 SHEETS—SHEET 2.
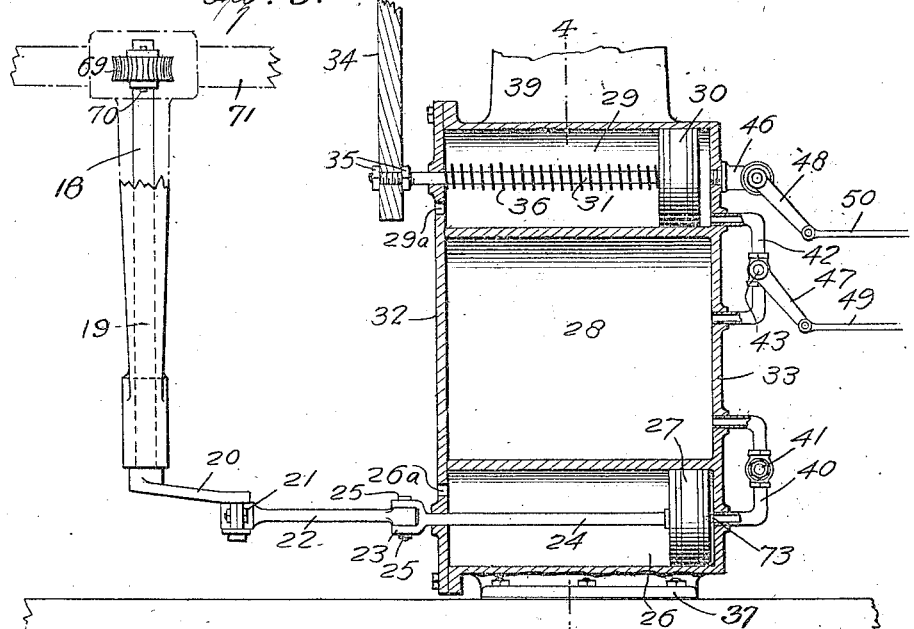
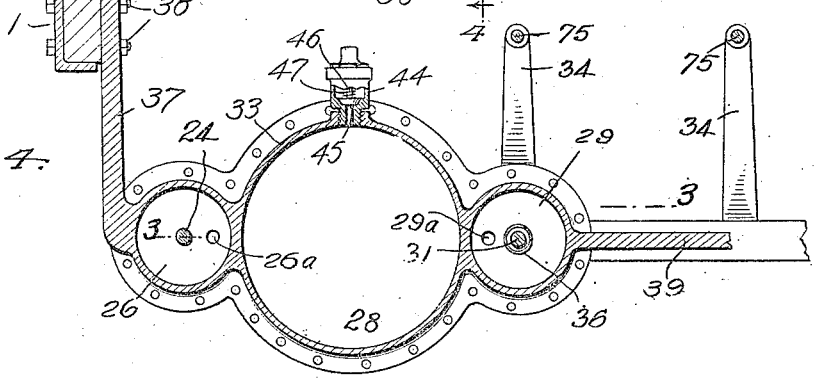
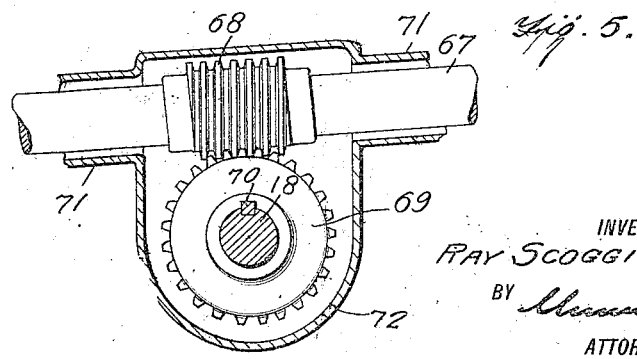
WITNESSES
INVENTOR
RAY SCOGGIN,
BY
ATTORNEYS

UNITED STATES PATENT OFFICE.

RAY SCOGGIN, OF EUGENE, OREGON.

AIR-BRAKE.

1,195,103.  Specification of Letters Patent.  Patented Aug. 15, 1916.

Application filed July 7, 1914. Serial No. 849,403.

*To all whom it may concern:*

Be it known that I, RAY SCOGGIN, a citizen of the United States, and a resident of Eugene, in the county of Lane and State of Oregon, have invented a new and useful Improvement in Air-Brakes, of which the following is a specification.

My invention is an improvement in air brakes, and has for its object to provide a brake of the character specified, especially designed for use with automobiles and like vehicles wherein the brake is operated by fluid under pressure controlled by the driver, having separate and independent operating and releasing means for the brake, and wherein a pump is operated by the motor of the vehicle for compressing air and storing it for use in operating the brake.

In the drawings:—Figure 1 is a sectional view of the brake mechanism in connection with an automobile, the section being taken substantially on the line 1—1 of Fig. 2, Fig. 2 is a partial plan view, Fig. 3 is a section on the line 3—3 of Fig. 4, Fig. 4 is a section on the line 4—4 of Fig. 3, looking in the direction of the arrow adjacent to the line, and Fig. 5 is a sectional view of the worm gear housing.

The present embodiment of the invention is shown in connection with the frame 1 of an automobile, wherein a brake disk 2 is secured to the rear axle 3, adjacent to each of the wheels 4. Each disk 2 is encircled by a brake band 5, the ends of which are connected to the opposite ends of a lever 6, secured intermediate its ends on a shaft 7, by means of links 8 and 9, respectively. The shaft is journaled in bearings 10 on bracket arms 11, extending forwardly from the housing 12 of the rear axle, and an upstanding arm 13 is rigidly connected with the shaft near one side of the frame 1 of the vehicle.

A link 14 is connected at one end to the arm 13, and the other end of the link passes through a bar 15, arranged transversely of the frame, and slidable at its ends between guides 16, secured to the inner face of the channel bars forming the sides of the frame 1 of the vehicle. Nuts 17 are threaded on to the link on opposite sides of the bar, and a crank shaft 18 is journaled in a bearing 19 transversely of the frame in front of the shaft 7.

The shaft 18 is provided with a crank 20 at one side of the frame, and the crank is connected to a pump to be described. The wrist pin of the crank 20 is engaged by a sectional bearing 21 on one end of a link 22, and the other end of the link is received between the arms 23 of a fork on the outer end of a piston rod 24 of the pump. A bolt 25 is passed transversely of the arms 23 and of the link to pivotally connect the link to the piston rod. The piston rod extends through an opening in one end of a cylindrical compartment 26 in a casing at that side of the frame and to be later described, and is connected with the piston or plunger 27 slidably mounted in the cylinder.

The casing just mentioned, has three compartments, a large central cylindrical compartment 28, and lateral compartments, namely, the compartment 26 before mentioned, and a compartment 29. A piston or plunger 30 is arranged in the compartment 29, and a piston or plunger rod 31 is connected at one end to the piston. At its other end the rod extends through an opening in the head 32 of the casing, which contains the three compartments just mentioned. The outer end of the rod passes through an opening in a bar 34, and nuts 35 are threaded on to the said end on each side of the bar.

A coil spring 36 encircles the rod 31 of the piston or plunger 30, between the same, and the head 32 of the casing, and acts normally to press the piston toward the opposite end of the cylindrical compartment or cylinder. The casing 33—32 is provided at one end with an extension 37 which is secured to the adjacent channel bar of the frame by bolts and nuts 38, and at the opposite side from the extension 37 the casing has an integral connection 39 with the opposite side of the frame. The head 32 is provided with ports 26ª and 29ª at each compartment or cylinder 26 and 29, and at the opposite end from the port 26ª the cylinder 26 has a port, which is connected to a similar port in the compartment 28, by means of a pipe 40.

A valve casing and a valve 41 is interposed in the pipe for controlling the communication of the cylinder 26 with the compartment 28, and a similar pipe 42 connects the compartment 28 with the compartment 29, the pipe 42 being arranged similarly to the pipe 40 and having a valve and valve casing 43 interposed in the length thereof for controlling the communication of the cylinder 29 with the cylinder 28. The compartment 28 is provided with a port in its upper side with which is engaged a valve casing 44. A conical seat is formed in the casing 44, and a valve 45 coöperates with the seat. The valve has a stem 46, passing upwardly into a guide in the casing, and a coil spring 47 encircles the stem and acts normally to seat the valve. The compartment 29 is also provided with a port at the opposite end from the port 29ª, and the valve casing 46 is engaged with the port, the valve in the casing controlling the communication through the port. Arms 47 and 48 are connected with the valves in the casings 43 and 46, and links 49 and 50 are connected with the respective arms at one end of the links. The link 49 extends forwardly to a connection with a radial arm 51, on a shaft 52, to be presently described, and the link 50 extends forwardly to a connection with a radial arm 53 on a shaft 54, journaled transversely of the frame.

A treadle lever 55 is rigidly connected at one end with the shaft for convenience in operating the same, the treadle having a foot plate 56 at its upper end, and a coil spring 57 is arranged between the lever and a perforated lug 58 on the casing 59. It will be obvious that when the treadle lever is pushed forwardly to oscillate the shaft 54 the link 50 will be moved rearwardly to swing the arm 48 toward the casing.

The shaft 52 before mentioned, is journaled in bearings 60 in arms 61, extending forwardly and downwardly from a casing 62 supported by the frame, and a shaft 63 is journaled in the casing, and is provided at its lower end with a bevel gear 64, which meshes with a similar gear 65 on the shaft 52. The upper end of the shaft 63 is provided with a handle 66 for moving the shaft, and the handle is above the foot plate of the treadle.

The crank shaft 18 is driven from the motor shaft 67 by means of a worm 68, secured to the said shaft and meshing with a worm wheel 69, secured to the crank shaft 18 by means of key 70. The motor shaft is journaled in a housing 71, and the worm wheel 69 and the worm 68 are housed in an extension 72 from the housing 71.

The operation of the improved brake is as follows:—When the motor is running the crank shaft 18 will be driven and the pump piston 27 at the side of the frame will be operated to compress air in the pressure chamber 28. The cylinder 26 is provided with an inlet port 73 in the end adjacent to the pipe 40, and as the piston is reciprocated air will be drawn into the cylinder and will be forced out through the pipe 40 into the storage chamber 28. The valve in the casing 41 is a check valve to prevent the return of the air to the cylinder 26.

The inlet 73 has a check valve to prevent passage of the air outward, and the valve 45 in the casing 44 is a safety valve for preventing over pressure in the chamber 28. The spring 47 is set to release the valve at a predetermined point and the tension of the spring may be varied to provide for varying pressures. When it is desired to apply the brake, the shaft 63 is oscillated in a direction to move the link 49 rearwardly and to open the valve in the casing 43 to permit the air under pressure in the storage tank or compartment 28 to pass into the compartment 29. As the air under pressure enters, the piston 30 is forced rearwardly.

The bar 34 is connected to the adjacent end of a bar 74, and the ends of the said bar 74 are connected by links 75 to the bar 15 before mentioned. Each end of each of the links 75 is threaded, and lock nuts 76 and 77, respectively, are threaded on to the front and the rear ends of the links on opposite sides of the bars 15 and 74. Because of this connection the bar 15 will be moved rearwardly by the piston or plunger 30, and the shaft 7 will be oscillated in a direction to tighten the brake bands 5 on the disks 2. To release the brake, it is only necessary to open the valve in the casing 46, this valve being the release valve. When it is opened by turning the shaft 63 in the proper direction the air exhausts from the cylinder 29 and the spring 36 drives the piston 30 toward the front end of the cylinder, forcing out the air and leaving the mechanism in condition to be again operated when desired.

The casing 33—32 may be of any suitable material that will withstand a pressure of 60 pounds to the square inch. There is always ample air pressure in the storage tank, and there can be no over-loading of the tank because of the safety valve 45. The ports 26ª and 29ª of the compartments 26 and 29 are for permitting the free passage of air to and from the adjacent ends of the compartments during the movements of the pistons or plungers.

I claim:—

In a vehicle provided with brake mechanism and with means for operating the same, a casing comprising a main storage compartment and a lateral cylindrical compartment at each side of the central compartment, a piston in each of the last-named compartments, a rod connected with each piston, the rods extending through adjacent ends of the compartments, the said end of each compartment having a port, one of the rods being connected with the brake operating mechanism, a spring for moving the piston away from the brake operating mechanism, the other rod being connected with means driven by the motor of the vehicle for reciprocating the said piston, a connection between the last-named compartment and the central storage compartment at the opposite end from the port, a check valve in the said connection, a connection between the other compartment and the central storage compartment at the said last-named end, a valve in the said connection, an exhaust valve in the said last-named cylindrical compartment at the said last-named end, and manually controlled mechanism for operating each of the last-named valves.

RAY SCOGGIN.

Witnesses:
JESSE G. WELLS,
RAYMOND WELLS.